& nbsp;

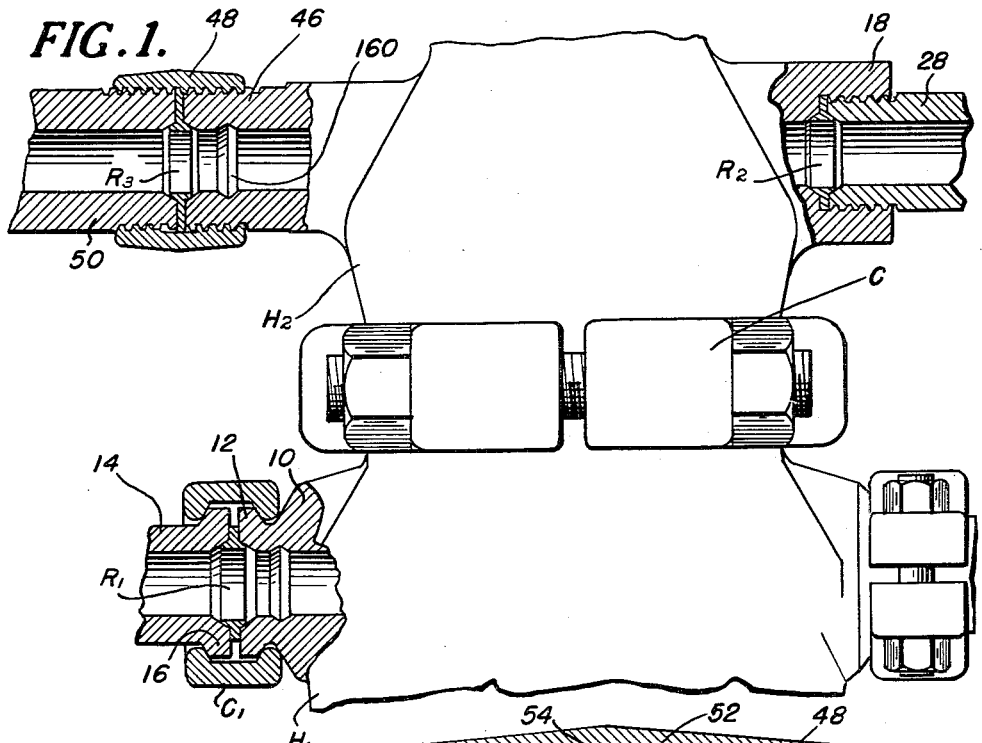
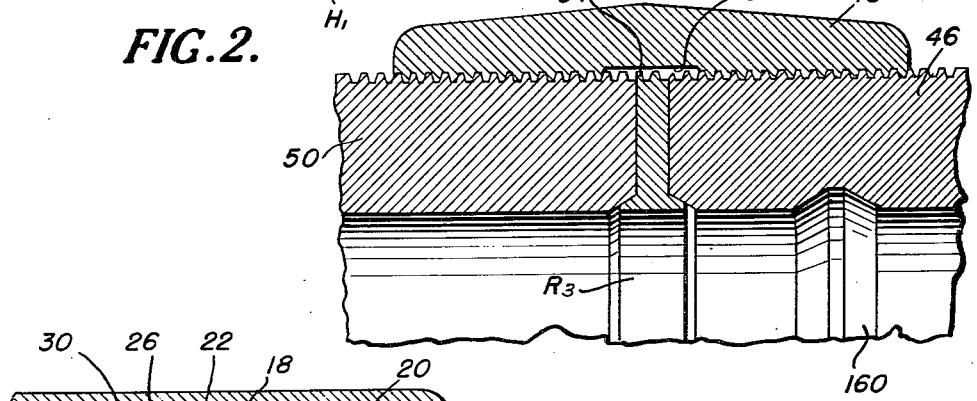
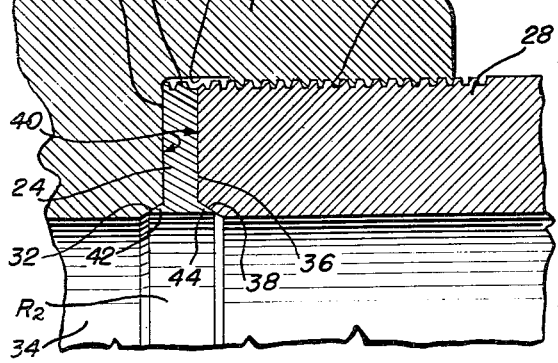

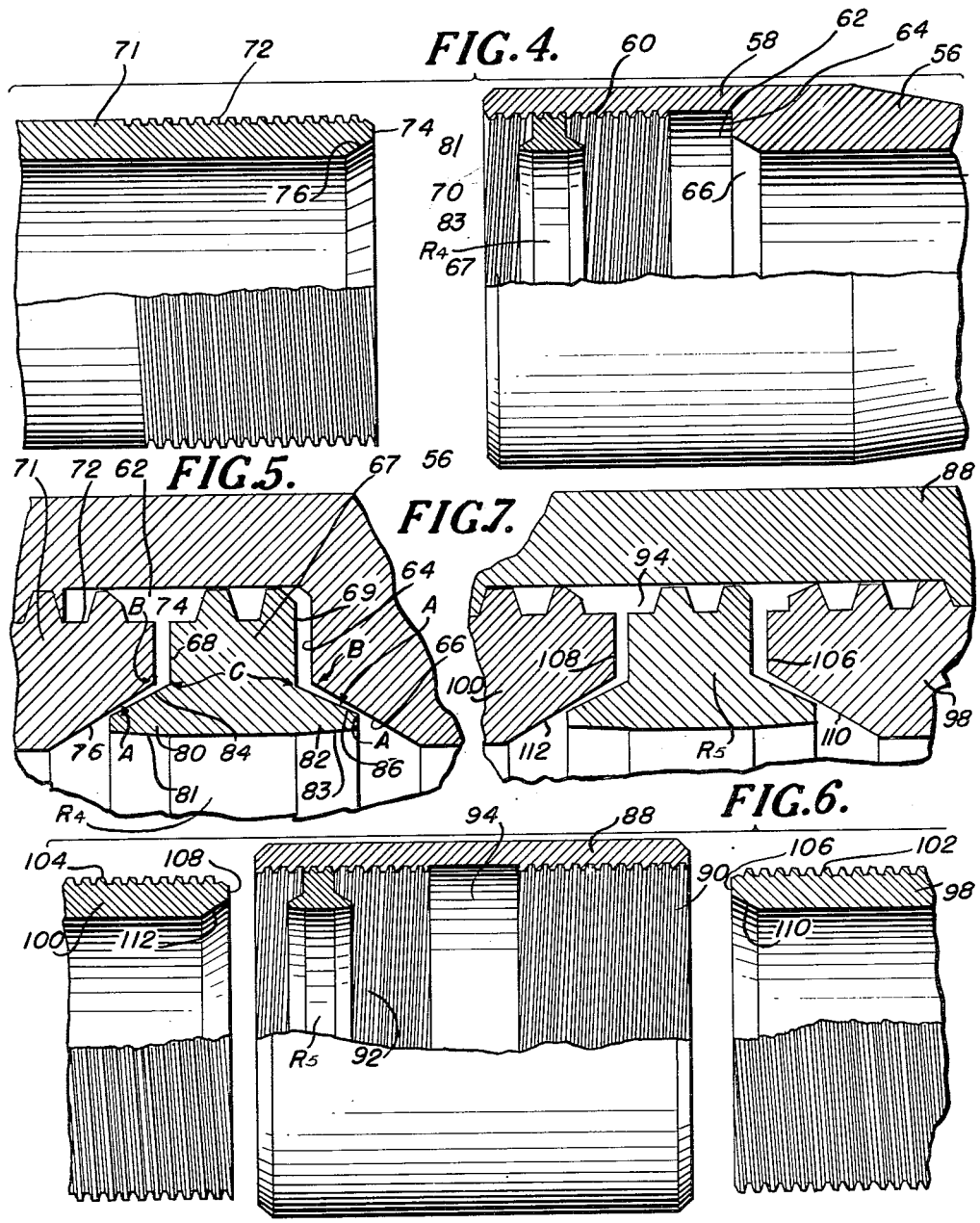

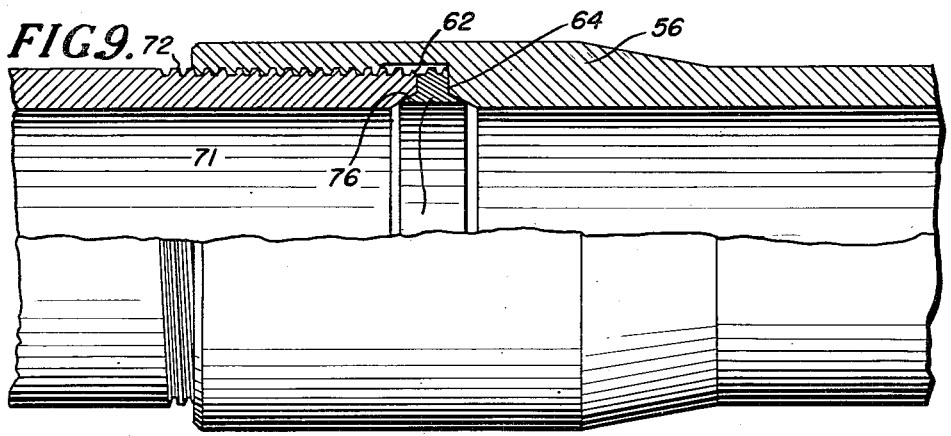
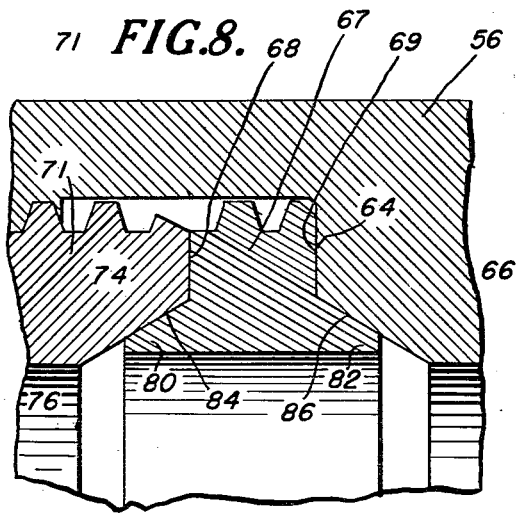
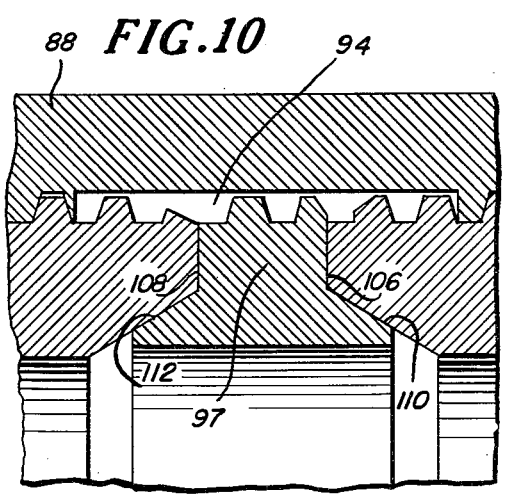
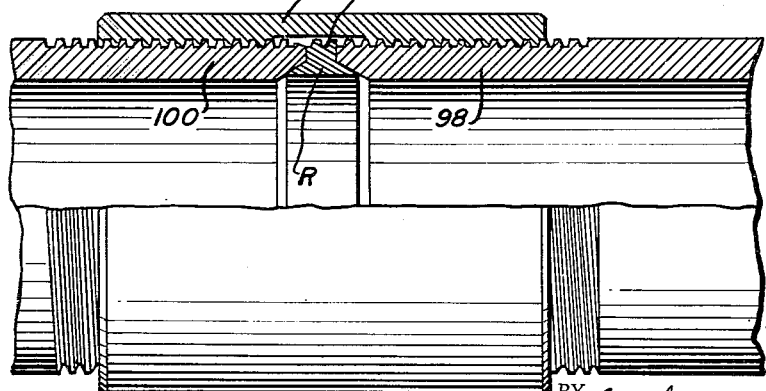

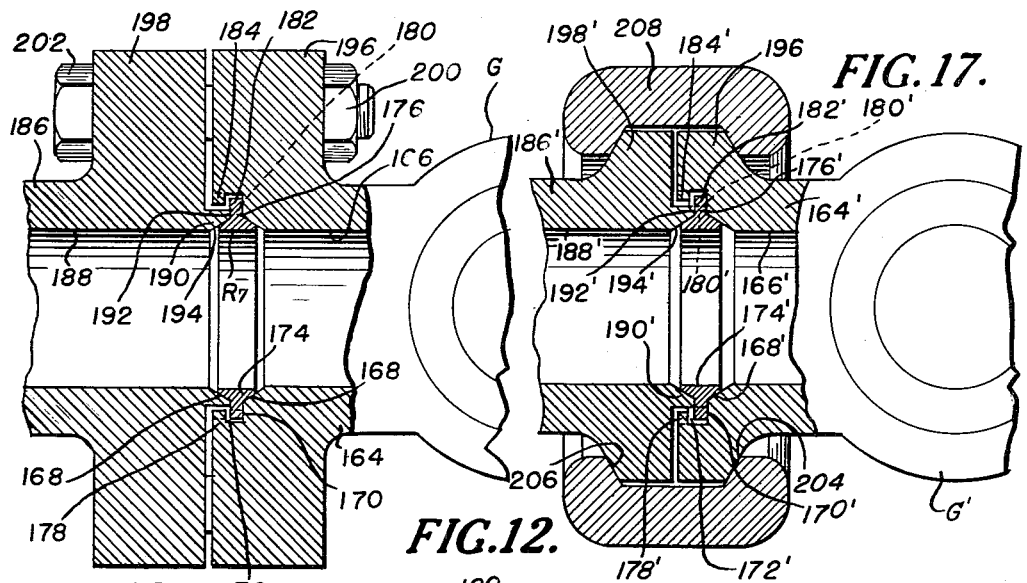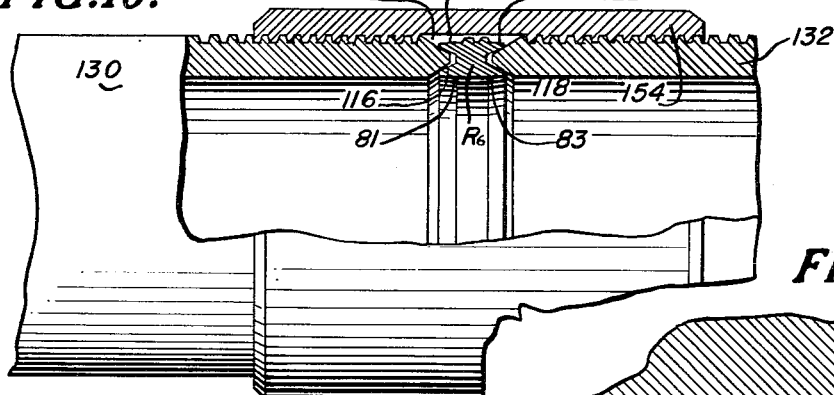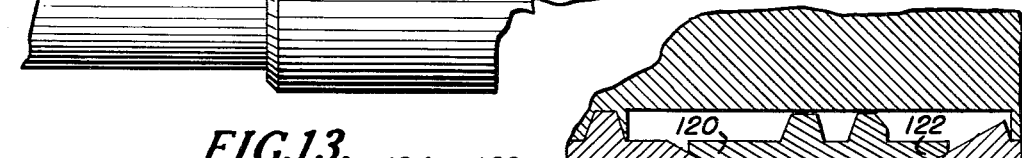

United States Patent Office 2,766,998
Patented Oct. 16, 1956

2,766,998

CONDUIT CONNECTION WITH CONICALLY FORMED INTERENGAGING SEATS ON SEAL AND CONNECTION MEMBERS

John D. Watts and Erwin F. Hill, Houston, Tex., assignors to Gray Tool Company, Houston, Tex., a corporation of Texas Application April 7, 1953, Serial No. 347,364

5 Claims. (Cl. 285—341)

The present invention relates to conduit connections, and is an improvement in such connections designed to withstand extremely high pressures, as well as lower pressures, while reducing the area subject to such pressures in the conduit, to a minimum, and while maintaining a full bore through the connection for the passage of tools and the like. By the expression "full bore," we mean the maintaining of an unobstructed diameter through the connection substantially equal to the interior diameter of the fluid passages which lead up to the connection on each side thereof.

In a copending application of John D. Watts and Erwin F. Hill, Serial No. 340,372, which was filed on March 4, 1953, entitled "Well Head Equipment," of which the instant application is a continuation-in-part there is disclosed and claimed certain equipment employing a similar high pressure connection between conduit parts, and including the use of a novel sealing ring, and associated parts. The present invention is an improvement upon the subject-matter of the said application of Watts and Hill, just referred to, and discloses adaptations and variations of the sealing connection as disclosed and claimed therein and in particular, such improvements and variations in the sealing ring and associated parts, as will adapt the invention for wider uses. For instance, the present invention discloses the use of the novel sealing ring and associated parts, for effecting high pressure connections in pipe lines and the like, either at a well head, or at any point where sections of pipe are connected to one another. For example, the present invention shows the high pressure connection as employed when connecting the ends of pipes to casing heads, tubing heads or Christmas tree parts, or with valves in pipe lines, either adjacent to the well, or at points remote from the well, as in refineries. The present application also discloses adaptations of the high pressure connection for use in such as oil well tubing, casing and the like.

It is an object of the present invention to provide such a high pressure connection, which may be used at the union between sections of pipe of various types, for instance, including threaded pipe connections of the two part or male and female type, as well as connections of the three part type where a separate collar is employed to connect the threaded ends of pipe sections which are presented toward one another. As described herein, the invention likewise has applicability to such pipe connections of the unthreaded type, such as those which are connected by conventional flange and bolt arrangements, or where wedging flanges are employed at the connection, in association with a multiple part clamp which is tightened against the wedging surfaces and laterally of the conduit line, as disclosed in the said copending application of Watts and Hill. The sealing ring disclosed herein is of the design disclosed in the said copending application of Watts and Hill, but with certain improvements, being of unitary construction and made of metal or the like, to be disposed between the ends of the conduit parts, for sealing the ends of the conduit parts when the latter are drawn relatively toward one another, the sealing ring having an inner annular flange portion with oppositely disposed flexible lips, and an integral substantially centrally disposed external rib portion, the lips having exterior sealing surfaces which taper outwardly toward the rib portion of the ring and which are adapted to engage and seal with cooperating sealing surfaces on the conduit parts. The sealing ring of the present application, like that of the copending application referred to, includes the rib portion as referred to, with opposite faces to engage the end surfaces of the conduit parts to limit the degree of movement of the conduit parts toward one another. Similarly, the sealing ring of the present application, like that of the copending application referred to, has oppositely disposed lips with exterior surfaces which taper outwardly at an acute angle from the axis of the ring which is slightly less than the angle of taper of the cooperating tapering surface of the conduit parts, and the lips are flexible construction, whereby they are yieldingly flexed inwardly when the conduit parts are drawn toward one another so that their exterior surfaces maintain themselves tightly and flush against the tapering surfaces of the conduit parts. As indicated, the construction and functioning of the sealing ring, and associated parts, is basically the same as disclosed in the said copending application of Watts and Hill, and the disclosure of the said copending application is incorporated in the present application by reference.

A particular object of the invention is to provide a high pressure connection having the advantages as disclosed in the said copending application of Watts and Hill, and employing a sealing ring and associated parts of improved design, whereby the sealing ring may be preliminarily installed and maintained in or adjacent to one of the ends of the conduit parts to be connected, prior to the coupling of the conduit parts. For instance, the sealing ring may be preliminarily disposed in the end of one of the conduit parts, in the case of a male and female pipe connection, or in the collar of a three part pipe connection which employs a separate collar to complete the connection. In the case of valves or well head fittings, the sealing ring may be preliminarily installed and maintained in an outlet nipple which is integral with the valve, well head part or the like. By "well head part," we intend to refer to such as casing heads, tubing heads, valves or blowout preventers in the well head assembly, or other conventional fittings and adapters conventionally used on a well head. The sealing ring may likewise be preliminarily installed in other parts or fittings, at locations other than on a well head, and at points where it is desired to effect a high pressure fluid type connection with piping leading to or from such parts or fittings.

Another object of the invention is to provide a high pressure connection which secures automatic self-alignment of the pipe ends or similar parts being connected, and which exactly positions or spaces the ends of the pipes or similar parts in predetermined relation with respect to one another.

Various other objects and advantages of the invention will be apparent as the description herein progresses.

In the drawings:

Figure 1 is a side elevational view of a portion of an assembly used in the well head or super-structure of an oil well. The view shows certain of the outlet nipples from the well head parts, in section, to demonstrate the construction of several variations of the high pressure connection used in the invention.

Figure 2 is an enlarged partial vertical sectional view through the ends of two conduit parts which are joined in a high pressure union, showing the invention employed with a three part connection, which employs a threaded connecting collar. This view illustrates in more detail, the union at the outlet nipple leading from the upper left hand side of the well head assembly shown in Figure 1.

Figure 3 is an enlarged vertical sectional view, similar to Figure 2, but disclosing a two part or male and female connection, the view being an enlargement of the connection shown at the upper right hand side of the well head assembly of Figure 1.

Figure 4 is an enlarged vertical sectional view showing the ends of two pipe sections presented toward one another, preparatory to connecting same, and illustrating the manner in which the sealing ring may be threaded into a chamber in the end of one of the pipe sections, to be preliminarily maintained therein, prior to the completion of the connection.

Figure 5 is an enlarged partial vertical sectional view, showing the sealing ring after it has been threaded into the receiving chamber in the end of one of the pipe sections, and showing the end of the opposed pipe section in the position it occupies just before it engages the sealing ring.

Figure 6 is a view similar to Figure 4, but disclosing the invention employed in a connection of the three part type, where a separate connecting collar is used to draw the ends of the pipe sections toward one another.

Figure 7 is a view similar to Figure 5, but showing the sealing ring located in the chamber of a connecting collar, just prior to the completion of the union, the connection being of the three part type, as illustrated in Figure 6.

Figure 8 is a view similar to Figure 5, but showing the condition of the parts when the union is completed, with the lips of the sealing ring contracted inwardly.

Figure 9 is a view similar to Figure 8, showing the union completed, as referred to.

Figure 10 is a view similar to Figure 7, but showing the union completed, and with the lips of the sealing ring contracted inwardly.

Figure 11 is another view similar to Figure 10, showing the completed union of the three part type, employing the separate connecting collar.

Figure 12 is a view in partial vertical section showing a variation of the invention, wherein a double acting sealing ring is employed.

Figure 13 is an enlarged sectional view, similar to Figure 12 showing in more detail, the relationship of the parts when the ends of the pipe sections contact the sealing ring.

Figure 14 is an enlarged sectional view similar to Figure 13, but showing the condition of the parts when the union is completed, with the lips of the sealing ring of this special design expanded so that they are flush against and in sealing engagement with the cooperating sealing surfaces on the ends of the pipe sections.

Figure 15 is a vertical sectional view taken through one of the sealing rings of the present invention. This view shows the exact dimensions of such a ring which has been found to be satisfactory for use in a connection for 2″ pipe.

Figure 16 is a top plan view of one side of an ordinary gate valve, showing its connecting nipple in section, and showing a further modification of a high pressure union. The connecting means at the union, comprises ordinary flanges and bolts.

Figure 17 is a view similar to Figure 16, showing the modified sealing connection in association with connecting means of the wedge and clamp type, as is described in detail in the said copending application of Watts and Hill, Serial No. 340,372.

In Figure 1 a well head assembly is shown, comprising for example a first casing head $H^1$ and a second casing head $H^2$ mounted above the same, these casing heads having wedging flanges presented toward one another and being connected by a clamp C as described in the copending application of Watts and Hill referred to. This connection would include the use of a sealing ring as described in the said copending application, or such a sealing ring may have been used and removed because of the presence of a hanger for an inner pipe, which serves to complete the seal, as described in the said copending application. The casing head parts $H^1$ and $H^2$ are shown equipped with various kinds of outlet nipples, to illustrate various adaptations of the invention, although in a particular installation, it is probable that the outlet nipples would be of a uniform design, i. e., any one of the designs as shown in Figure 1. While Figure 1 shows various designs of outlet nipples leading from casing head parts, of an oil well, it will be understood that this view is intended to illustrate connecting assemblies which might be employed on other types of fittings, either on an oil well or at other points, such as connections to ordinary valves of the gate or similar types.

On one side of the casing head part $H^1$, there is an outlet nipple 10 provided with a wedging flange 12 of the type disclosed in the copending application of Watts and Hill, and the end of a connecting pipe section 14 is formed with a similar wedging flange 16. The interior surfaces of the wedging flanges are formed to receive and seal against a sealing ring $R^1$, and the wedging flanges are drawn together by a clamp $C^1$, all as described in the said copending application of Watts and Hill. While we refer to the part 14 as the end of a pipe section, it will be understood that this part may be a nipple which is integral with and extends from a valve, such as a conventional gate valve, whereby such a valve may be attached directly to a casing head part, and such valve might be similarly equipped with an outlet nipple on its opposite side, to similarly connect with the end of a pipe section, likewise designed as illustrated for the end of the pipe section 14. The design of such a valve, and its manner of connection, as described, is shown at 76 of Figure 7 of the said copending application, although the valve referred to in that application is shown as a part of the Christmas tree.

The upper right hand part of Figure 1 shows an outlet connection from the casing head part $H^2$, of the two part, or male and female type. Again, while this design of connection is shown on what is disclosed as a casing head part, it will be understood that a nipple for this connection, including a chamber to preliminarily receive and maintain the sealing ring, might be employed on one or both sides of a conventional valve. Figure 3 shows the connection just referred to, in greater detail. The outlet nipple from the casing head part is designated with the numeral 18, and it has a bore which is threaded as at 20, inwardly from its outer end, and the threaded portion of the bore terminates in an enlarged unthreaded chamber 22, which is designed to preliminarily receive and maintain the sealing ring $R^2$. The sealing ring $R^2$ is of construction and functions as disclosed in the said copending application of Watts and Hill, except that its rib 24 is somewhat elongated, and on the outer end of this rib, there are several threads 26 of pitch corresponding with the threads 20. The unthreaded chamber 22 is of width somewhat greater than the width of the rib 24, so that when the sealing ring is threaded through the threads 20, it is retained in the chamber 22 while being capable of limited longitudinal movement therein, prior to the time when the union is completed by the inward threading of the pipe 28. The exterior diameter of the threads 26 on the sealing ring is only slightly less than the diameter of the chamber 22, so that the sealing ring is maintained in the chamber 22 in substantial axial alignment. The inner end of the chamber 22 has a straight wall or end surface 30 and there is an annular tapered sealing surface 32 adjacent to the passage 34 through the nipple. The inner end of the connecting pipe 28 is flat forming an end surface as at 36, and it also has a tapered sealing surface 38, adjacent to the passage through the pipe. The flat surfaces 30 and 36 engage the flat exterior faces 40 of the rib 24 of the sealing ring R², and the tapered surfaces 32 and 33 engage the inner tapered surfaces of the lips 42 and 44 of the sealing ring, and deflect them inwardly to form a tight seal, as described in the copending application of Watts and Hill.

Figure 2 shows in detail the type of connection shown on the casing head part H², at the upper left hand corner thereof, involving the use of the same type of sealing ring, in a union which has a separate threaded collar to connect the nipple to the end of an adjacent pipe section. As previously mentioned, while such a connection is shown on the side of a casing head part, it might be used on one or both sides of a valve, or other fitting, or it might be used at any point in a pipe line, or at any time where a fluid coupling or connection is being made. The nipple 46 on the casing head part H² is exteriorly threaded to receive the interiorly threaded collar 48, and the end 50 of an adjacent pipe section is likewise threaded, for connection into the opposite end of the collar 48. The collar 48 is interiorly threaded from its opposite ends, and at the center of the collar there is an enlarged unthreaded chamber 52 which separates the flights of threads leading from opposite ends of the collar. The rib of the sealing ring R³ is exteriorly threaded as at 54, whereby it may be threaded inwardly through the threads from either end of the collar until it reaches the chamber 52. The sealing ring is thus held in position within the collar, and is thus ready to seal with the ends of the conduit sections when same are threaded into the collar in the same manner as has been described in connection with Figure 3.

In the embodiments of both Figures 2 and 3, it will be observed that because of the symmetrical design of the sealing ring, and the corresponding design of the ends of the conduit parts, the sealing ring is self-aligning and it will automatically align the conduit ends and properly space them in predetermined relation when the connection is completed with the end surfaces of the conduit parts in contact with the rib of the sealing ring.

Figures 4, 5, 8 and 9 disclose the details of a connection of the male and female type, as would be used in an ordinary pipe line. Referring to Figure 4, the end of a pipe section is enlarged as at 56, and the enlarged end constitutes a sleeve 58 which is provided with interior threads 60. An enlarged unthreaded chamber 62 is formed inwardly of the threads 60, and the inner wall 64 of this chamber constitutes an end surface for engaging the rib of the sealing ring, as hereinafter described. Adjacent to the surface 64, there is a tapered sealing surface 66 which is adapted to engage the lip of the sealing ring. The sealing ring is shown at R⁴, and it has on the outer face of its rib 67, a few screw threads 70 which correspond with the threads 60 in the sleeve. The sealing ring is threaded through the end of the sleeve until it is disposed in the enlarged chamber 62, as previously described. The chamber 62 is somewhat wider than the width of the rib of the sealing ring, so that the sealing ring may move a limited distance longitudinally in the chamber. The end of the adjacent pipe section 71 is threaded as at 72 and it has an end surface 74 and a tapered sealing surface 76 as previously described, to engage the rib and lip, respectively, of the sealing ring, when the connection is made. Figure 5 shows the relation of the parts when the threaded end 71 of the connecting pipe is threaded into the sleeve of the pipe end 56, up to a point where it is just about to contact the sealing ring. In Figures 8 and 9, the pipe end 71 is shown tightly threaded into the sleeve of the pipe end 56 until its end surface 74 engages the flat face 68 of the rib of the sealing ring. In comparing Figure 8 with Figure 5, it will be noted that the lips 80 and 82 of the sealing ring are deflected inwardly until their tapered sealing surface 84 and 86 are flush against and parallel with the tapered sealing surfaces 76 and 66, respectively, on the pipe ends.

As best shown in Figure 5, the tapers of the sealing surfaces 76 and 66 are somewhat steeper than the corresponding tapered sealing surfaces 84 and 86 on the outside of the lips 80 and 82 of the sealing ring, so that as the pipe end 71 is further threaded into the sleeve of the pipe end 56, the angle, at about the point of contact A (Figure 5) between the sealing surfaces becomes progressively more acute, until the time when the end surfaces 74 and 64 contact the outer faces of the rib of the sealing ring, at which time the sealing surfaces 84 and 86 are parallel with and flush against the opposed sealing surfaces 76 and 66, respectively. When the seal is thus completed, the lips 80 and 82 have been flexed inwardly around pivot points in the inner flange portion of the sealing ring, which pivot points are somewhere in the neighborhood of the base ends of the sealing lips, adjacent to the corner points C.

When the end of the connecting pipe 71 is threaded tightly into the sleeve of the pipe end 56, as referred to, the lips of the sealing ring are deflected to the condition shown in Figure 8. The sealing ring is made of suitable material, such as steel, and is designed so that this deflection of the lips is within the elastic limit of the material, whereby energy is stored in the lips 80 and 82 and they place themselves tightly against the sealing surfaces 76 and 66. When the union is thereafter subjected to the pressure of fluid within the pipes or conduits, this pressure is exerted outwardly against the inner face of the inner flange of the sealing ring to make the sealing action more effective. It will be understood that only a moderate force is required, in turning the pipe ends with respect to one another, in order to deflect the lips of the sealing ring, yet the union is a very effective one, because the pressure subject area is substantially reduced and the pressure acts against the flange of the sealing ring, to increase the effectiveness of the seal thus formed. The person completing the union will always know when he has properly completed the union, for it is only necessary to turn the end of one pipe with respect to the other until the end faces 74 and 64 contact the faces of the rib of the sealing ring, and this contact will be perceptible to the person completing the union. It is not possible to make the union too tight because the rib of the sealing ring provides a definite stop. It will be noted, of course, and particularly in Figures 8 and 9, that the sealing ring does not reduce the internal diameter of the pipe line, as the bore through the sealing ring is at least as great as the diameter of the passage through the pipes being connected.

It will be understood that the sealing ring R⁴, like the other sealing rings disclosed herein, is preferably made of an elastic steel, as distinguished from compressible prior art gaskets of the packing type which are permanently distorted by pressure, and which do not resume their original shape when the applied pressure is removed. Of course, the sealing rings of the present invention will maintain their rigid construction and when supported in position between the end surfaces of the conduit parts, they cannot be blown out by pressure within the passage through the conduit parts. As described in the said copending application of Watts and Hill, and as shown for instance in Figure 5, the sealing ring comprises an inner continuous annular flange having the oppositely extending lips 80 and 82, and an integral, continuous and annular supporting and strengthening rib 67 having opposite flat stop faces 68 and 69. The lips 80 and 82 are sufficiently elastic to be bent inwardly from the position of Figure 5 to that of Figure 8, but this is a flexing movement within the elastic limit of the material, and the metal is preferably not of such malleable nature as to be drawn or permanently distorted.

The tapered sealing surfaces of the sealing ring, and the corresponding surfaces on the conduit parts are preferably polished so that there is pressure tight contact between the surfaces when the lips are flexed. When the conduit parts are threaded up so that their end surfaces tightly engage the sealing ring, as shown in Figure 8, a substantially uniform structure results, with the lips of the sealing ring supported outwardly by the ends of the conduit parts, and with the central part of the flange of the sealing ring supported outwardly by the relatively heavy rib 67 which forms an integral part of the sealing ring.

The rib of the sealing ring is of such mass that it maintains the diameter of the sealing ring, and the sealing ring is not reduced in overall diameter when fully clamped between the end surfaces of the conduit parts. The sealing action is rather confined to a simple flexing of the lips of the sealing ring, whereby the force which is required to make a very tight seal is only normal. Referring to Figures 5 and 8, it will be noted that the corner points B and C, on the conduit parts and sealing ring, respectively, are in the same longitudinal alignment after the connection is completed, as they were before the conduit parts were fully tightened toward one another. The action of the sealing ring and associated parts when the union is completed, and the advantages thereof, are described in detail in the copending application of Watts and Hill, previously referred to.

Figures 6, 7, 10 and 11 disclose the similar action which takes place when the sealing ring is used in a separate collar connector 88. This collar has flights of interior threads 90 and 92 at opposite ends thereof and a central slightly enlarged unthreaded chamber 94. The sealing ring R5 has threads on the exterior of its rib, whereby it may be threaded through either end of the collar, until it reaches the chamber 94, where it is loosely maintained all as previously described. The pipe ends 98 and 100 are exteriorly threaded, as at 102 and 104, so that they may be threaded into the collar, and they have end surfaces 106 and 108 to engage the rib of the sealing ring, and tapered sealing surfaces 110 and 112, to engage the tapered surfaces of the lips of the sealing ring. The sealing ring R5 is the same in construction, and it functions the same as the sealing ring described in connection with Figure 5. Figure 7 shows this sealing ring in the chamber 94 of the collar 88 with the pipe ends 98 and 100 threaded through the collar to a point where they are almost in contact with the sealing ring. Figures 10 and 11 illustrate the condition of the parts when the coupling is completed, i. e., when the pipe ends have been threaded inwardly through the collar 88 until they grip the sealing ring between them. Referring particularly to Figure 10, it will be noted that the end surfaces 106 and 108 of the pipe ends, are in engagement with the outer face of the rib 97 of the sealing ring, and the tapered surfaces 110 and 112 of the pipe ends have deflected the lips of the sealing ring inwardly, so that these lips are tight and flush against the tapered surfaces 110 and 112, and in effective sealing engagement therewith. As in other embodiments of the invention, it will be understood that fluid under pressure within the pipe, will act against the inner face of the sealing ring, and the pressure will thus tend to tighten the seal. As in other embodiments, a full bore is maintained through the sealing ring, and the internal area subject to pressure is kept at a minimum.

In the embodiments which have been described, the sealing ring comprises an inner annular flange and an integral exterior strengthening rib, made of steel or other suitable material of such resiliency, that the lips of the sealing ring may flex inwardly when contacted by the tapered sealing surfaces on the pipe ends. In the embodiment of Figures 12 through 14, a modification is shown in which the unitary, annular sealing ring R6 of metal has the same inner lips 116 and 118, as previously described, and also similar exterior lips 120 and 122 in order to seal both to the outside, as well as to the inside of the pipe ends. The two sets of lips are connected by an integral rib portion 124 (Fig. 13) having exterior flat faces 126 and 128. The pipe ends 130 and 132 have flat end surfaces 134 and 136, and on each side of these flat surfaces, there are inner and outer tapered sealing surfaces 138, 140 and 142, 144, respectively. This sealing ring functions in a manner similar to that described in connection with the principal embodiment. The lips 116 and 118 have outer tapered sealing surfaces 146 and 148, and the outer lips have inner tapered sealing surfaces 150 and 152. As viewed in Figure 14, the taper of surfaces 138, 140 and 142 and 144 are somewhat steeper than the taper of the cooperating sealing surfaces 148, 152, and 146, 150 of the sealing ring. When the pipe ends are threaded inwardly until their surfaces 134 and 136 contact the faces 126 and 128 of the rib of the sealing ring, the lips 116, 118, 120 and 122 are deflected outwardly from one another, within the elastic limit of the material from which these lips are made, and as illustrated in Figure 14, thereby forming a tight seal against the corresponding surfaces of the pipe ends. The general relationship of the parts before the union is made is similar to that shown in Figure 6. The collar is shown at 154, and as in the embodiment of Figure 6, it is internally threaded from the opposite ends, and there is a central enlarged unthreaded chamber 156 formed between the threaded areas to receive the sealing ring. The sealing ring R6 may be threaded into the chamber 156, where it will be loosely retained. When the pipe ends 130 and 132 are threaded into the collar 154, their surfaces engage the corresponding surfaces of the sealing ring as shown in Figure 13. Due to the symmetrical construction of the sealing ring, it is self-aligning and the ring adjusts itself to the ends of the pipe as the pipe ends are moved inwardly until they are stopped by the engagement of their end surfaces 134 and 136, against the faces 126 and 128, respectively, of the rib 124 of the sealing ring. In this embodiment, the sealing ring acts to properly align the ends of the pipe sections, and properly positions and spaces them in predetermined relation.

Throughout the specification, we have emphasized that the invention provides a rigid sealing connection which reduces the area subject to pressure within the passage of the conduit parts, to a minimum, and that the sealing ring provides a full bore, equal to that of the passages through the conduit parts, in order not to restrict any operations which might be necessary, involving the passing of tools or the like through the connection or union which is formed. For instance, in Figure 1, the passage through the nipple 46 leading from the casing head part H2 is shown formed with an annular groove 160. This groove may be provided, in the nipple of such a well head part, to receive some type of expansible plug which would close the passage through the nipple, when desired. For instance, and assuming that the pipe end 50 extending outwardly from the nipple 46 (Figure 1) is the side outlet nipple of a valve, the annular recess 160 could be used to receive a plug which could be passed through the valve, and sealed in the groove 160, in preparation for removing the valve, for purposes of repair or replacement. This groove 160 is also shown in Figure 2. It will be understood that the nipple 46 might likewise be provided with a flight of interior threads, at the position of the groove 160, in order to receive a threaded plug, incident to the removing of a valve which might be attached to the nipple by the type of high pressure union as disclosed herein. Under these circumstances, the advantage of an unrestricted flow passage through a connection and the need for a sealing ring with a full bore, will be appreciated.

While we show a union of the male and female type, in Figure 9, as compared with a union employing a separate coupling, it will be understood that in each instance, the sealing ring is preliminarily housed or maintained within a sleeve which extends from one of the conduit parts. In Figure 9, the sleeve is integral with one of the conduit parts, whereas in Figure 11, the collar 88 constitutes such a sleeve, and it is threaded to and extends from the conduit part 98. In each instance, there is a first conduit part which has a sleeve extending therefrom, with internal threads to engage external threads on a second conduit part, and the first conduit part has a tapered sealing surface and an end surface within this extending sleeve, and a chamber for the sealing ring located outwardly beyond these surfaces, in order to thereby carry the sealing ring for limited longitudinal movement in the chamber prior to the time when the second conduit part is threaded into the sleeve in order to permanently clamp the sealing ring.

It will be understood that the invention is capable of various modifications from the specific construction shown herein. In Figure 4, the threads 60 within the sleeve 58, and the threads on the perimeter of the sealing ring $R^4$, provide for the passage of the sealing ring into the chamber 62. The threads 60 also serve as a part of the means to connect with the end 71 of the second conduit part. It will be understood that other well known means might be provided to connect the conduit parts, and draw them toward one another. When the sealing ring $R^4$ reaches the chamber 62, and is loosely carried therein, the inner edge of the last flight of threads 60, together with the outer edge of the outer flight of threads 70 on the sealing ring, constitute the stop means which prevents the sealing ring from being displaced from the chamber 62. Likewise, the end surface 64 in the sleeve 58 together with the inner edge of the rib on the sealing ring $R^4$, serves as a stop means to limit any inward movement of the sealing ring. Thus, the sealing ring is loosely maintained, as far as longitudinal movement is concerned, in the chamber 62, but it is in substantial alignment in preparation for the final sealing action, when the pipe end 71 is threaded home into the sleeve 58. Essentially, the sealing ring is maintained in a chamber in one of the conduit parts, in position and alignment to receive the male end of another conduit part which enters this chamber. Obviously, equivalent means could be employed to draw the conduit parts together, and equivalent means could be provided which would permit the insertion and retaining of the sealing ring in the chamber. It will be understood that a similar situation, as referred to, exists in the case of the embodiment of Figure 6.

Referring to Figure 16, an ordinary gate valve is shown at G, and it is shown formed on one of its sides with an outlet nipple 164. While only one side of the valve is shown, it will be understood that a similar nipple and associated parts as hereinafter described would be provided on the opposite side of the valve. The nipple 164 includes the inlet or outlet passage 166 to or from the valve, and at the outer end of this passage there is a tapered sealing area 168 as previously described, and an end surface 170, likewise as previously described. Outwardly of these surfaces, there is an enlarged chamber 172, to house the sealing ring $R^7$. The sealing ring is of construction as previously described, including the inner flange 174 with the flexible lips, and the integral rib 176. The outer side of the chamber 172 is defined by an annular flange 178, the inner wall of which forms one side of the chamber 172. The chamber 172 is somewhat wider than the width of the rib 176 of the sealing ring, whereby the sealing ring may be preliminarily positioned in the chamber, for limited longitudinal axial movement therein, while maintaining itself in substantial axial alignment with the passage 166. The outer perimeter of the sealing ring is indicated by the dotted line 180, and around this perimeter, one or more extending lugs 182 may be formed. These lugs are of such width as to pass through slots 184 formed in the inner edge of the flange 178. One slot on the flange, and one lug on the rib of the sealing ring would suffice, but there may be two or more of such cooperating slots and lugs, equally spaced, and in order to insert the sealing ring into the chamber 172, the lugs 182 are aligned with the slots 184, whereby the sealing ring may be passed inwardly to the chamber 172. Thereafter, if the sealing ring is given a slight turn, it will be retained in the chamber 172, by the flange 178.

The valve is shown connected to the end 186 of a pipe line, having a passage 188 which is aligned with and of diameter equal to that of passage 166. The end 186 of the pipe section has an extending annular male abutment 190 likewise formed with an end surface 192 and with an outwardly tapered sealing surface 194, all as previously described. The nipple 164 is equipped with an ordinary flange 196, and the pipe section 186 is equipped with an ordinary connecting flange 198, so that the flanges may be pulled together by a plurality of spaced bolts 200 with nuts 202, as is well known in the art.

With the construction as shown, the sealing ring $R^7$ may be preliminarily placed in and retained in the chamber 172, and when the union is to be made up, the abutment 190 on the end of the pipe section 186 may be inserted into the opening of the flange 178 leading to the chamber 172. The respective end and sealing surfaces on the pipe section and the valve nipple will then contact the sealing ring, in the manner previously described, and when the nuts 202 are tightened, the lips of the sealing ring will be flexed inwardly until the end surfaces contact the outer faces of the rib 176 of the sealing ring, all as previously described, in order to complete the high pressure union.

In Figure 17 we show a similar valve $G^1$ equipped with a similar outlet nipple 164', of the same design as in the case of Figure 16, as far as the receiving and housing of the sealing ring is concerned, but this nipple is of modified construction in that it has a wedge-type flange 196'. The end of the pipe section 186' is formed as described in Figure 16, except that its end flange 198' is of the wedge type. That is, the flanges 196' and 198' are relatively short, and they have exterior wedging surfaces 204 and 206 adapted to cooperate with complementary wedging surfaces on the sections of a clamping connector 208. This clamping connector comprises two or more parts, which are drawn together by laterally extending bolts, so that the wedging surfaces of the clamp acting on the wedging surfaces 204 and 206, evenly draw the flanges 196' and 198' toward one another, in order to act upon the sealing ring and complete the seal. This clamping connector is described in detail in the said copending application of Watts and Hill, Serial No. 340,372, and this action is illustrated and described in connection with Figures 8, 16, 17 and 18 of that application. Of course, the copending application describes in detail the action of the sealing ring, when the connection is effected, particularly in connection with Figures 8, 10 and 11 of the said copending application.

The construction of Figure 17, other than in the type of connecting means, is identical with that of Figure 16, and the description previously given applies. Similar and corresponding numbers, using the prime, have been applied in Figure 17 and the description need not be repeated.

Throughout all embodiments of this application, it will be understood that the integral rib of the sealing ring is relatively heavy, and of substantial mass, as compared with the lips of the sealing ring. When the conduit parts are drawn toward one another, and when the sealing lips are flexed to form the pressure seal, there is no change in the overall diameter of the sealing ring. That is, the rib maintains a constant diameter, and the sealing ring is not and cannot be expanded outwardly by the pressure which is exerted on the sealing ring, from within the conduit. The inward flexing of the lips does not constitute an overall compression or reduction in diameter of the sealing ring. The inward movement is local, within the lips, the rib maintaining a uniform diameter. When the seal is completed, there is thereafter no outward expansion of the sealing ring. The action of the sealing ring is thus quite unlike other seals which are distorted or compressed inwardly, when the union is completed, or seals in which the sealing ring is distorted or may be expanded outwardly by internal pressure. The heavy body of the sealing ring, its rib, is not deflected, but is gripped between the end surfaces of the conduit parts and maintains a constant diameter. Once the seal of the present invention is completed, there is no further flexing or variation at the union, as a result of fluctuating pressures within the conduit. The parts are tight against one another, and no movement between the parts, which might cause wear and leakage is possible. The position of the parts is the same under high pressure, as it is if no pressure exists in the conduit. Using the connection of the present invention, preloading of the clamping means is possible, and a rigid joint, at all times, is assured.

As stated herein, and described in detail in the said copending application of Watts and Hill, Serial No. 340,372, the seal provided by the sealing ring, is completed by the inward flexing of the lips of the sealing ring around pivot points in the flange portion of the sealing ring, which pivot points are somewhere in the neighborhood of the base ends of the sealing lips, adjacent to the corner points C as shown in Figure 5. The inner faces of the lips 80 and 82 may be formed to taper outwardly to a slight degree, as indicated at 81 and 83, respectively (Figure 5), from the central inner surface of the flange of the sealing ring, and when the sealing ring is in its normal or unclamped condition. The inward bending of the sealing lips, as a result of the clamping action, is indicated in Figure 8, where it will be observed that the tapered portions 81 and 83 no longer appear, the inner face of the flange of the sealing ring being substantially straight throughout its entire length, when the sealing ring is tightly clamped between the parts 56 and 71. It will be understood that the various sealing rings illustrated herein are formed and function as described, the slight taper of the inner faces of the lips being likewise indicated in Figures 6, 7 and 15. The double lip sealing ring of Figure 13 may be similarly formed, it being noted that the exterior surfaces of the lips 116, 118, 120 and 122 are similarly slightly tapered, and that this taper disappears when the said surfaces are straightened out by the deflection of the lips when the union is completed, as illustrated in Figure 14.

We claim:

1. A high pressure coupling comprising first and second conduit parts having end surfaces presented toward one another, each of said conduit parts having aligned fluid passages therein the walls of which terminate in outwardly flaring sealing surfaces adjacent said end surfaces of said parts, a unitary sealing ring of hard metal or the like for sealing the ends of said parts when they are drawn toward one another, said sealing ring comprising an inner annular flange portion with oppositely disposed flexible lips and an integral substantially centrally disposed external rib portion, said lips having exterior sealing surfaces which taper away from said rib portion and which are adapted to engage and seal with said flaring sealing surfaces on said conduit parts, said sealing surfaces of the conduit parts tapering outwardly with respect to the longitudinal axes thereof at an angle normally greater than the angle of taper of the exterior sealing surfaces of said lips, said rib portion having opposite faces which engage the end surfaces of said conduit parts and limit the degree of movement of said parts toward one another, and a sleeve carried by and extending outwardly from the end of said first conduit part and beyond the end and sealing surfaces thereof, said sleeve having a chamber therein of diameter sufficiently large to receive the rib of said sealing ring, said sleeve and said second conduit part having interconnecting means to draw said conduit parts toward one another and into engagement with the rib of said sealing ring, to flex said lips and bring said sealing surfaces of said lips and conduit parts into full sealing engagement.

2. A high pressure coupling comprising first and second conduit parts having end surfaces presented toward one another, each of said conduit parts having aligned fluid passages therein the walls of which terminate in outwardly flaring sealing surfaces adjacent said end surfaces of said parts, a unitary sealing ring of hard metal or the like for sealing the ends of said parts when they are drawn toward one another, said sealing ring comprising an inner annular flange portion with oppositely disposed flexible lips and an integral substantially centrally disposed external rib portion, said lips having exterior sealing surfaces which taper away from said rib portion and which are adapted to engage and seal with said flaring sealing surfaces on said conduit parts, said sealing surfaces of the conduit parts tapering outwardly with respect to the longitudinal axes thereof at an angle normally greater than the angle of taper of the exterior sealing surfaces of said lips, said rib portion having opposite faces which engage the end surfaces of said conduit parts and limit the degree of movement of said parts toward one another, and an internally threaded sleeve connected with and extending outwardly from said first conduit part and beyond the end and sealing surfaces thereof, said sleeve having a chamber therein disposed inwardly of its threads and of diameter sufficiently large to receive the rib of said sealing ring, said second conduit part having external threads to engage the internal threads of said sleeve to draw said conduit parts toward one another and into engagement with the rib of said sealing ring, to flex said lips and bring said sealing surfaces of said lips and conduit parts into full sealing engagement.

3. A high pressure conduit connection comprising first and second conduit parts having aligned fluid passages and a unitary sealing ring of hard metal or the like disposed between said parts, said first conduit part having an enlarged sleeve extending outwardly from its end, said second conduit part having an outwardly tapering sealing surface at the end of its passage, said first conduit part having a similar outwardly tapering sealing surface at the end of its passage and located within its sleeve, the interior of said sleeve being formed with an enlarged chamber disposed outwardly of said sealing surface on said first conduit part and having a reduced bore beyond said chamber which is of great enough diameter to receive the end of said second conduit part, said sealing ring comprising an annular flange portion with oppositely disposed flexible lips, said lips having exterior outwardly tapering sealing surfaces to engage said sealing surfaces on said conduit parts, said sealing surfaces of the conduit parts tapering outwardly with respect to the longitudinal axes thereof at an angle normally greater than the angle of taper of the exterior sealing surfaces of said lips, said sealing ring having an exterior rib formed to provide for the insertion of said sealing ring past the reduced bore of said sleeve and into said chamber and for the restraining of said ring against displacement from said chamber prior to the connection of said conduit parts, said connection including means for drawing said conduit parts toward one another and against the rib of said sealing ring to flex said lips and form a seal by the engagement of said tapering sealing surfaces.

4. A construction in accordance with claim 3, wherein the rib of said sealing ring is of thickness less than the length of said chamber whereby it is capable of limited longitudinal movement in said chamber.

5. A construction in accordance with claim 4, wherein said sleeve is interiorly threaded outwardly of said chamber and wherein said second conduit part is provided with corresponding threads on its exterior adjacent its end, said threads on said sleeve and second conduit part constituting the means for drawing the ends of the conduit parts toward one another and said threads in said sleeve constituting the means for retaining said sealing ring in said chamber.

(References on following page)

References Cited in the file of this patent

UNITED STATES PATENTS

| Number | Name | Date |
|---|---|---|
| 190,965 | Foster | May 22, 1877 |
| 278,800 | Kline | June 5, 1883 |
| 557,645 | Blessing | Apr. 7, 1896 |
| 790,093 | Wiedeman | May 16, 1905 |
| 951,704 | Schmidt | Mar. 8, 1910 |
| 1,265,706 | Bardeen | May 7, 1918 |
| 1,819,036 | Oberhuber | Aug. 18, 1931 |
| 1,876,455 | Inshaw | Sept. 6, 1932 |
| 2,211,983 | Parris | Aug. 20, 1940 |
| 2,216,945 | Hinderliter | Oct. 8, 1940 |
| 2,486,120 | Colton | Oct. 25, 1949 |

FOREIGN PATENTS

| Number | Country | Date |
|---|---|---|
| 1,115 | Great Britain | Jan. 20, 1892 |
| 485,480 | Great Britain | May 20, 1938 |
| 544,656 | France | June 29, 1922 |
| 801,604 | Germany | Dec. 7, 1950 |